United States Patent [19]

Izumiya et al.

[11] Patent Number: 4,689,457
[45] Date of Patent: Aug. 25, 1987

[54] WIRE-CUT ELECTRIC DISCHARGE MACHINE

[75] Inventors: Shunzo Izumiya, Hachioji; Yuji Okuyama, Tama; Masaya Ito, Hino, all of Japan

[73] Assignee: Fanuc Ltd, Minamitsuru, Japan

[21] Appl. No.: 878,837

[22] PCT Filed: Oct. 11, 1985

[86] PCT No.: PCT/JP85/00564
§ 371 Date: Jun. 12, 1986
§ 102(e) Date: Jun. 12, 1986

[87] PCT Pub. No.: WO86/02299
PCT Pub. Date: Apr. 24, 1986

[30] Foreign Application Priority Data
Oct. 12, 1984 [JP] Japan .................. 59-212736

[51] Int. Cl.⁴ .................. B23H 1/02; B23H 7/04
[52] U.S. Cl. .................. 219/69 W; 219/69 C
[58] Field of Search .................. 219/69 W, 69 C; 204/206, 224 M

[56] References Cited

U.S. PATENT DOCUMENTS

| 4,383,160 | 5/1983 | Obara | 219/69 W |
| 4,510,367 | 4/1985 | Obara | 219/69 W |
| 4,559,434 | 12/1985 | Kinoshita | 219/69 W |
| 4,581,514 | 4/1986 | Inoue | 219/69 W |

FOREIGN PATENT DOCUMENTS

| 0093026 | 11/1983 | European Pat. Off. | 219/69 S |
| 52-61897 | 5/1977 | Japan | 219/69 W |
| 58-10236 | 2/1983 | Japan . | |
| 58-28428 | 2/1983 | Japan | 219/69 W |
| 58-58746 | 12/1983 | Japan . | |
| 59-69228 | 4/1984 | Japan . | |
| 59-97814 | 6/1984 | Japan . | |

Primary Examiner—A. D. Pellinen
Assistant Examiner—Geoffrey S. Evans
Attorney, Agent, or Firm—Staas & Halsey

[57] ABSTRACT

A wire-cut electric discharge machine, which displays a workable time (T) of a currently used wire electrode (2). A wire length when the wire is mounted on a bobbin (B1) and a wire feed speed are input through a manual input unit (7) and are stored in memory (6). During working (i.e., machining), a CPU (5) calculates a new, remaining wire length (L) from the wire length when the wire is mounted on the bobbin or a remaining wire length (L) and a wire feed speed (V) for predetermined time periods (step S1). A workable time (T) is calculated from the new, remaining wire length (L) and the wire feed speed (V) by the CPU (5), and is displayed by a display unit (8) (steps S2 and S3).

2 Claims, 3 Drawing Figures

WIRE-CUT ELECTRIC DISCHARGE MACHINE

BACKGROUND OF THE INVENTION

The present invention relates to a wire feed apparatus of a wire-cut electric discharge machine.

Conventional wire-cut electric discharge machines include those having a mechanical means for obtaining a remaining amount of a wire electrode (to be referred to as a wire hereinafter), those having a wire reel of a special design, and the like. These machines are all complex, high-priced, and inaccurate. A wire-cut electric discharge machine can operate for a long period of time without need of an operator. However, if the wire cannot complete the current work, operation is interrupted, resulting in damage to a work surface or loss of working time.

SUMMARY OF THE INVENTION

It is an object of the present invention to overcome the above drawbacks of the conventional technique and to display a workable time or a workable length of a currently used wire by a simple means.

In order to achieve the above object, a wire-cut electric discharge machine (to be referred to as an electric discharge machine hereinafter) according to the present invention comprises wire length input means for inputting a length of a wire when the wire is mounted on the electric discharge machine, wire feed speed input means for inputting the wire feed speed, and wire length storage means for storing a remaining wire length. A wire length calculating means calculates the remaining wire length at preset time periods from the wire length stored in the wire length storage means and the input wire feed speed, and stores the remaining wire length in the wire length storage means. In addition, the wire length calculating means calculates a workable time (i.e., machining time) from the stored remaining wire length and the wire feed speed with a workable time calculating means, and the calculated workable time is displayed on a display means.

In this manner, according to the present invention, when a new wire feed bobbin is mounted on the electric discharge machine, if the wire length is input, a workable time is displayed on a display unit. Therefore, interruption of machining caused by depletion of the wire is prevented, so that the work surface is not damaged due to the interruption of machining, and loss of working time is prevented. Since the workable time is displayed, automatic operation of the electric discharge machine can be performed easily.

DESCRIPTION OF THE PREFERRED EMBODIMENTS

Figure 1:
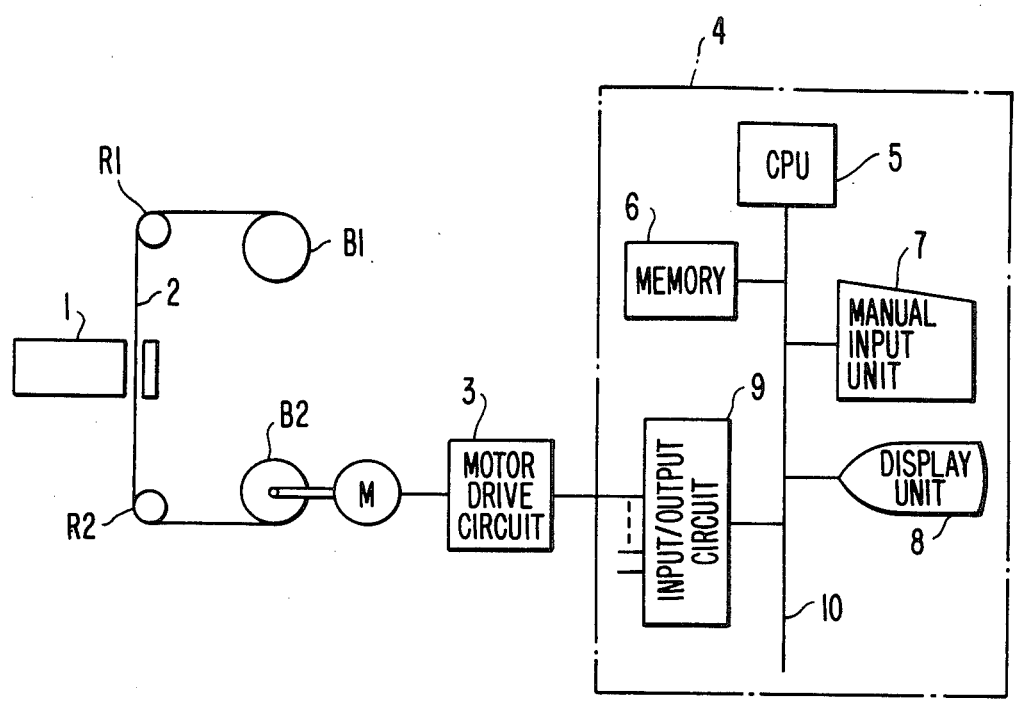
FIG. 1 is a diagram showing a main part of an electric discharge machine according to an embodiment of the present invention, in which part thereof is shown as a block diagram.

An embodiment of the present invention will be described with reference to the accompanying drawings. In FIG. 1, reference numeral 1 denotes a workpiece to be machined; 2, a wire used for machining; R1 and R2, rollers for guiding the wire 2; B1, a wire feed bobbin with unused wire wound therearound; B2, a wire takeup bobbin for taking up used wire; M, a motor for driving the wire takeup bobbin; 3, a motor drive circuit for driving the motor; and 4, a control unit of the electric discharge machine. In the control unit 4, reference numeral 5 denotes a central processing unit (to be referred to as CPU hereinafter) for controlling the entire electric discharge machine, and 6, a memory comprising a ROM storing a program for the overall control, a RAM for temporarily storing data, and a non-volatile memory for storing wire characteristics to be described later. Reference numeral 7 denotes a manual input unit, provided on a control panel or the like of the electric discharge machine, for inputting various preset values and operation commands; 8, a display unit such as a CRT; and 9, an input/output circuit, connected to various detectors or actuators such as a table drive unit of the electric discharge machine to which the work is mounted. FIG. 1 shows only the part of the input output circuit 9 which is concerned with this embodiment. The input/output circuit 9 is connected to the motor drive circuit 3. Reference numeral 10 denotes a bus.

The operation of the electric discharge machine of the embodiment of FIG. 1 will now be described with reference to the operation processing flow shown in FIG. 2.

First, an unused new wire feed bobbin B1 is mounted and set on the wire-cut electric discharge machine. A length L of the wire wound on the new wire feed bobbin B1 and a wire feed speed V are input at the manual input unit 7 and are stored in the memory 6. When the wire-cut electric discharge machine is started, the motor M is driven to run the wire 2 at the preset wire feed speed V, thereby initiating working. The CPU 5 performs working control and display processing for a workable time (as shown in FIG. 2) at predetermined preset time periods. More specifically, the CPU 5 reads the wire length L and wire feed speed V stored in the memory 6, subtracts, from the wire length L, a value V·t obtained by multiplying a time period t by the wire feed speed V, and stores the result in the memory 6 as a new wire length L (step S1). The new wire length L is divided by the wire feed speed V (step S2) and is stored in the memory 6 as a workable time T, and the workable time T (i.e., remaining machine time) is displayed on the display unit 8 (step S3). The workable time display processing is completed and the flow advances to the next step. The steps S1 and S3 are executed for every predetermined time period t. In other words, the memory 6 stores a current wire length L, and the display unit 8 displays a workable time T which changes after every time period t. When a workpiece 1 is completed and a next workpiece is to be processed, the length L of unused wire is stored in the memory 6 and the workable time T is displayed on the display unit 8. Therefore, the operator can determine whether the next workpiece can be completed.

In the above embodiment, the wire length L itself is input on the manual input unit 7 when a new wire feed bobbin B1 is used. However, this embodiment can be modified such that a total weight W of the bobbin B1 on which an unused wire 2 is wound, the specific weight $p$ of the wire 2, the diameter $2r$ or radius $r$ of the wire, and the weight K of the bobbin B1 are input via the manual input unit 7 instead of the wire length L. Alternatively, specific weights $p$ in accordance with the type of wire 2 and the weight K of the bobbin B1 as determined by its specifications can be stored as a table in the non-volatile memory of the memory 6, and the total weight W of the new bobbin B1 on which the wire 2 is wound and the diameter 2r or radius r of the wire 2 can be input from the manual input unit 7. In these modifications, the wire length L is calculated by an operation of the CPU 5 indicated by equation (2) below, in accordance with the various input data, and is stored in the memory 6.

More specifically, equation (1), and hence (2) is established between the total bobbin weight W and the input data:

$$W = \rho \pi r^2 L + K \quad (1)$$

$$L = (W - K)/\rho \pi r^2 \quad (2)$$

Generally, the time required for machining the workpiece 1 can be predicted from its finished shape. Therefore, if the workable time T depending on the length L of unused wire, can be obtained in the above manner, only the predicted work time and the workable time T must be compared to determine whether or not the next workpiece can be completed, thereby preventing interruption of machining.

Figure 3:
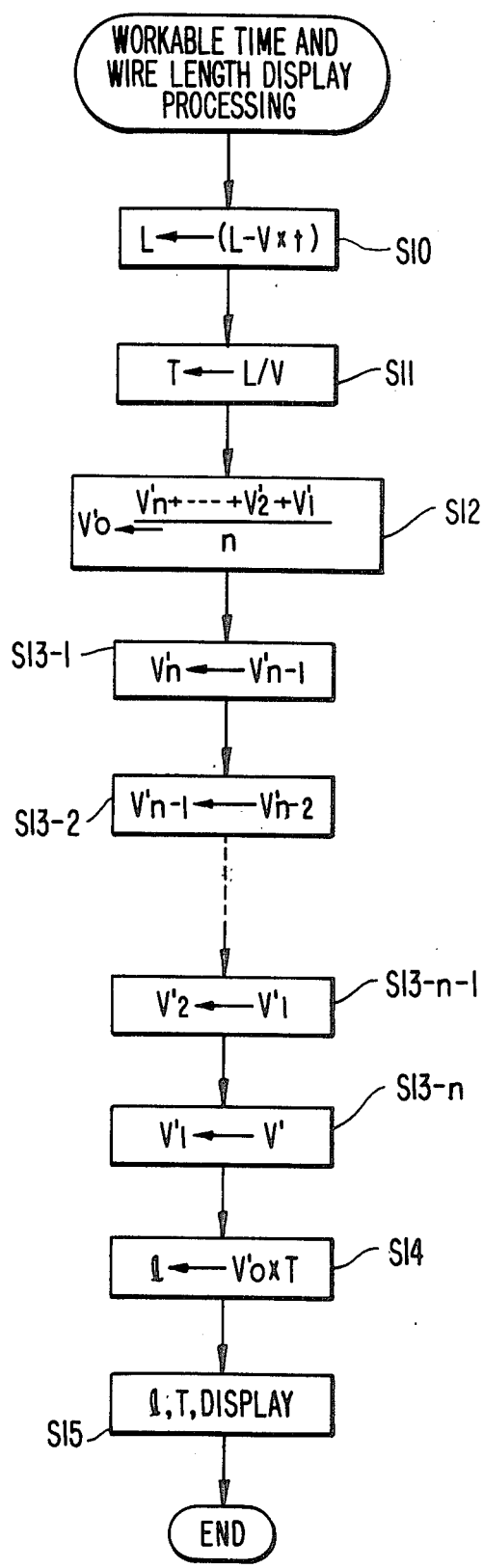
FIG. 3 is a flow chart of operation for another embodiment of the present invention.

FIG. 3 shows a process flow for another embodiment of the present invention. This embodiment is different from the above embodiment in that a workable wire length l is displayed in accordance with the following facts. Namely, in this embodiment, the relative speed between a wire 2 being used and a workpiece 1, i.e., a work feed speed V' for feeding a table holding the workpiece 1, is controlled by the control unit 4. Therefore, an average work feed speed $V'_0$ can be obtained by averaging the work feed speeds V', and the workable wire length l can be calculated from the average work feed speed $V'_0$ and a workable time T.

Figure 2:
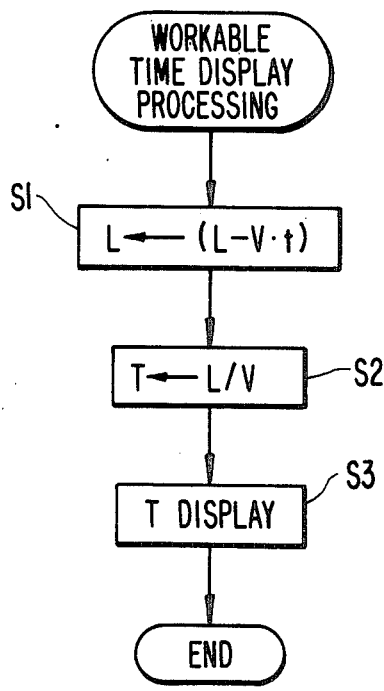
FIG. 2 is a flow chart of operation for the embodiment shown in FIG. 1.

In FIG. 3, steps S10 and S11 are the same as steps S1 and S2 of FIG. 2. The workable time T of the wire is calculated in steps S10 and S11. A memory 6 stores an actual work feed speed V' for every predetermined time period t, and thus stores speeds V' of 1 to n periods preceding the current period. The sum of the values $V'_1, \ldots V'_n$ of respective memory sections of the memory 6 is divided by the number n of the values, thereby obtaining an actual average work feed speed $V'_0$ for n periods immediately preceding the current period (step S12). The stored values of the memory sections are then sequentially shifted to update the contents thereof. More specifically, a memory section which stored value $V_n$ now stores value $V'_{n-1}$, a memory section which stored value $V'_{n-1}$ now stores value $V'_{n-2}, \ldots$ a memory section which stored value $V'_2$ now stores value $V'_1$, and a memory section which stored value $V'_1$ now stores the current work feed speed V', respectively (steps S13-1 to S13-n). The workable time T obtained in step S11 is multiplied by the average work feed speed $V'_0$ obtained in step S12, in order to calculate the workable wire length l for the workpiece 1 (step S14). When the workable time T and the workable wire length l obtained in steps S11 and S14 are displayed on the display unit 8, workable time and wire length display processing is completed, and the flow advances to the next step.

In the manner described above, in the present invention, the average value $V'_0$ of the work feed speed V' is obtained and then the workable wire length l from the current position is displayed. Therefore, when a new workpiece of the same work thickness is to be worked under the same conditions and the average work feed speed $V'_0$ does not substantially vary, it can be determined from the displayed workable wire length l whether or not the new workpiece can be completed.

What is claimed is:

1. A wire-cut electric discharge machine having a wire electrode and a control unit for controlling work feed speed, comprising:

wire length input means for inputting a value of a parameter representing a wire length of the wire electrode when the wire electrode is mounted on said wire-cut electric discharge machine, said wire length inputting means including means for inputting, as parameters, a total weight of a bobbin on which the wire electrode is wound, a diameter of the wire electrode, a specific weight of the wire electrode, and a weight of the bobbin, and means for calculating and inputting the length of wire mounted on the bobbin;

wire feed speed input means for inputting a feed speed of the wire electrode;

wire length storage means for storing a quantity representing remaining wire length;

wire length calculating means for calculating, at predetermined time periods, a remaining wire length from the wire length stored in said wire length storage means and the wire feed speed input through said wire feed speed input means, and for storing the obtained remaining wire length in said wire length storage means;

workable time calculating means for calculating a workable time from the remaining wire length stored in said wire length storage means and the wire feed speed;

display means for displaying the workable time calculated by said workable time calculating means; and average work feed speed calculating means for calculating an average work speed from work feed speeds for the predetermined time periods, each of the work feed speeds being controlled by said control unit, said wire length calculating means calculating the workable wire length from the average work feed speed obtained by said average work feed speed calculating means and the workable time, said display means also displaying the workable wire length.

2. A machine according to claim 1, further comprising memory means for storing specific weights of wire electrodes in accordance with the type of wire electrode, and weights of bobbins in accordance with specifications of the type of bobbin, wherein said wire length inputting means includes means for calculating and inputting the length of the wire electrode when the wire electrode is mounted on the bobbin from the total weight of the bobbin on which the wire electrode is wound, the diameter of the wire electrode, the type of the wire electrode, and the specifications of the bobbin, which are supplied as parameters via said wire length inputting means, and the specific weight of the wire electrode, and the weight of the bobbin, which are stored in said memory means.

* * * * *